United States Patent [19]

Beckwith

[11] Patent Number: 5,567,369
[45] Date of Patent: Oct. 22, 1996

[54] METHOD FOR DIE LIP TEMPERATURE ADJUSTMENT IN A THERMOPLASTIC EXTRUDER

[75] Inventor: Robert W. Beckwith, Cummaquid, Mass.

[73] Assignee: Sencorp Systems, Inc., Hyannis, Mass.

[21] Appl. No.: 461,864

[22] Filed: Jun. 5, 1995

Related U.S. Application Data

[62] Division of Ser. No. 45,477, Apr. 13, 1993, Pat. No. 5,462,423.

[51] Int. Cl.$^6$ ................................................. B29C 47/92
[52] U.S. Cl. .................. 264/40.1; 264/40.6; 264/40.7; 264/209.7; 425/379.1
[58] Field of Search ........................... 264/40.6, 40.5, 264/40.7, 519, 40.1, 209.7; 425/379.1, 144, 141, 466

[56] References Cited

U.S. PATENT DOCUMENTS

| 3,029,474 | 4/1962 | Voigt et al. | 264/519 |
|---|---|---|---|
| 3,775,035 | 11/1973 | Scotto et al. | 264/40.5 |
| 3,933,958 | 1/1976 | Hinrichs | 264/40.6 |
| 3,950,118 | 4/1976 | Adair | 264/40.6 |
| 4,425,290 | 1/1984 | Upmeier | 264/40.1 |
| 4,426,239 | 1/1984 | Upmeier | 264/40.1 |
| 4,793,788 | 12/1988 | Borger | 425/144 |
| 4,830,595 | 5/1989 | Bentivoglio et al. | 264/40.6 |
| 4,882,104 | 11/1989 | Dobrowsky | 264/40.6 |
| 5,229,140 | 7/1993 | Crass et al. | 264/40.6 |
| 5,281,375 | 1/1994 | Konermann | 264/40.3 |

FOREIGN PATENT DOCUMENTS

| 0149335 | 7/1985 | European Pat. Off. | 264/519 |
|---|---|---|---|
| 51-61562 | 5/1976 | Japan | 264/40.6 |
| 61-135726 | 6/1986 | Japan | 425/144 |
| 63-183826 | 7/1988 | Japan | 425/141 |

*Primary Examiner*—Jeffery R. Thurlow
*Attorney, Agent, or Firm*—Richard P. Crowley

[57] ABSTRACT

A method for the control of wall thickness of an extruded thermoplastic material. The method includes extruding a thermoplastic material from an extruder through a die gap formed between first and second die lips. One of the die lips has a plurality of separate sectors adjacent the die gap, with each sector having a circulating oil passageway therein. The circulating oil passageways are connected in a series along the die gap. The method includes circulating through each circulating oil passage, within each sector adjacent the die lip, a heat transfer oil from a common source at a selected heating or cooling temperature. The method includes controlling the rate of flow of said heat transfer oil in each sector by an adjustable flow control valve, in order to control the temperature of each sector, and thereby to adjust the viscosity of the thermoplastic material being extruded, and controlling the wall thickness of the extruded thermoplastic material.

10 Claims, 3 Drawing Sheets

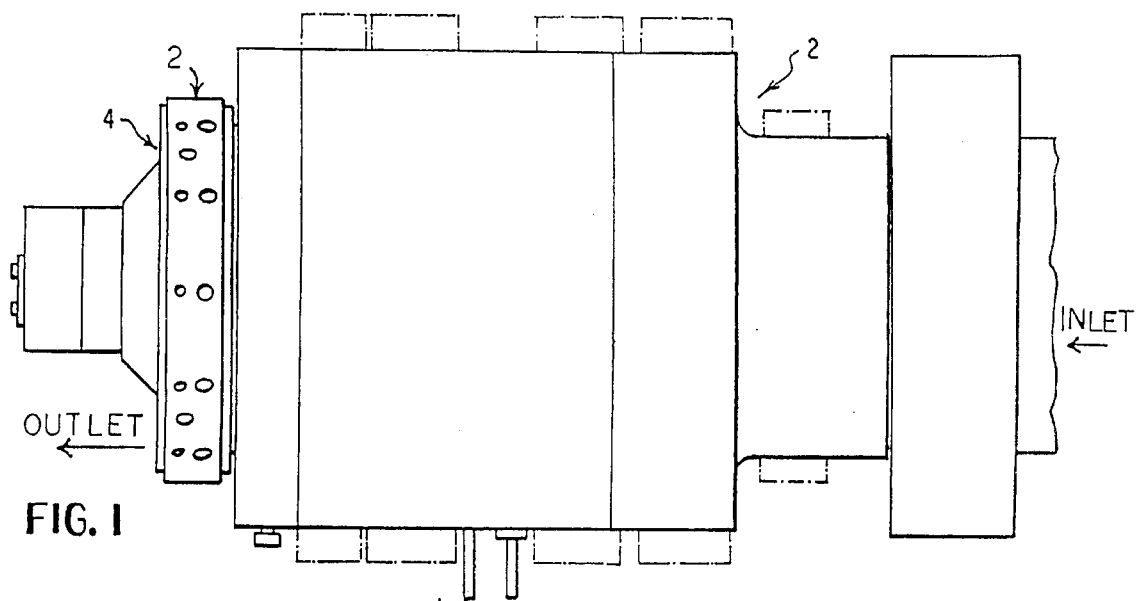
FIG. 1
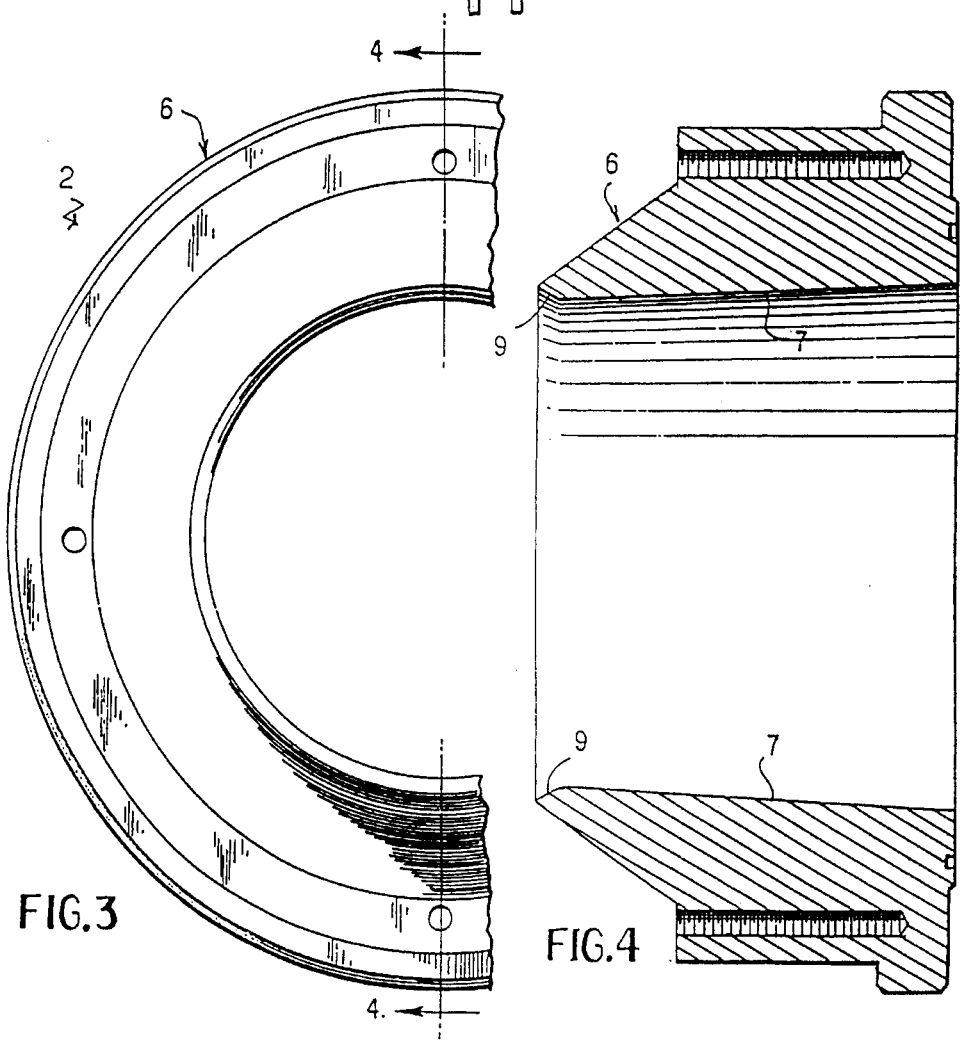
FIG. 3
FIG. 4

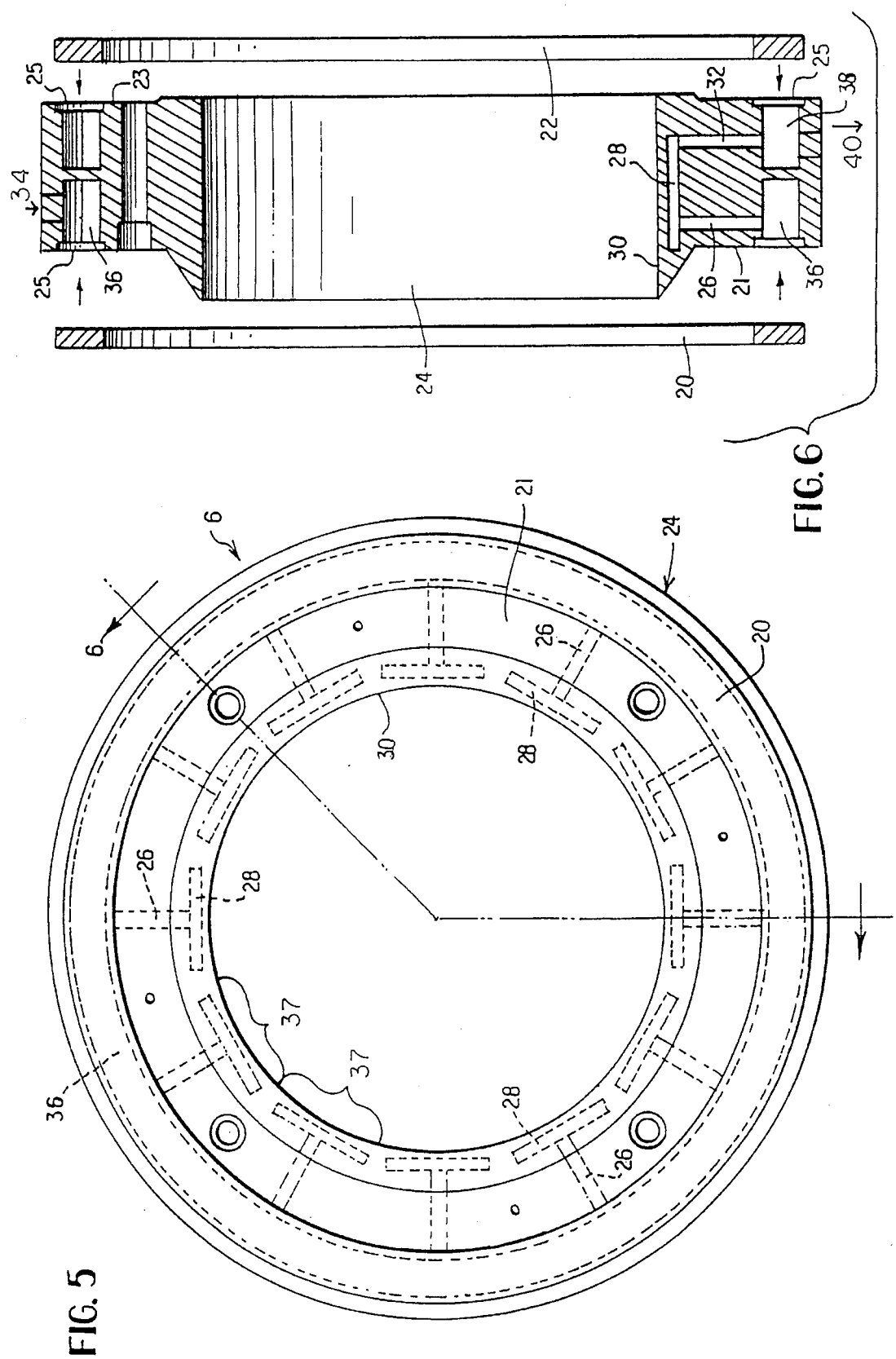

METHOD FOR DIE LIP TEMPERATURE ADJUSTMENT IN A THERMOPLASTIC EXTRUDER

This is a divisional of application Ser. No. 08/045,477, filed Apr. 13, 1993, now U.S. Pat. No. 5,462,423, issued Oct. 31, 1995.

FIELD OF THE INVENTION

This invention relates to the adjustment of the die lips in an extruder for plastic materials.

BACKGROUND OF THE INVENTION

Circular extrusion dies with inner and outer lips are usually adjusted for concentricity by a circle of bolts located radially around the outer die lip. Concentricity adjustment is necessary to achieve a consistent transverse thickness of the material leaving the die. In most cases, the adjusting bolts move the complete outer lip to obtain concentricity with the inner lip. A compromise is needed due to temperature and machining variations around the two lips. Where a higher degree of control is desired, a flexible outer lip may be used. The adjusting bolts push on segmented shoes which flex a small sector of the outer lip. This forces the lip into the desired shape to achieve uniform thickness of material. Heated expansion bolts are a further sophistication allowing a finer, remote controlled adjustment. Flexible lip dies suffer from a number of deficiencies, such as undesired distortion of areas adjacent to the sector being flexed by an adjusting bolt, requirement for large forces to flex the lips making repeatability and fine adjustment difficult, necessity for construction of a very thin flex lip which is then susceptible to machining distortion and damage, and complications in heat transfer to and from the outer die lip due to thin construction and intimate contact with the segmented shoes around the periphery.

Hahn, et al., U.S. Pat. No. 4,548,570, describes an extrusion apparatus for producing thermoplastic pipe. Adjustment of the thickness of the pipe is achieved by varying the heat to heater cartridges which causes thermoplastic material in proximity to the heated section of sleeve to become less viscous and to flow at a faster rate. This increases the amount of thermoplastic material at that location, compared with lesser heated sections of the extrusion passageway. Additionally, radial repositioning of the sleeve due to expansion of the heater bolts will increase the width of the arcuate portion of the melt passageway in proximity to the heated section of the sleeve, causing increased thickness of the thermoplastic material. This heating operation does not appear to take place at the die lips. Phipps, U.S. Pat. No. 4,201,534 describes a foam extrusion die assembly which is adjusted by means of screws in the area of the die lips. Yazaki, et al., U.S. Pat. No. 4,057,385, describes cooling a deckle so as to increase the viscosity of the molten resin around the deckle, to prevent leakage. Solop, U.S. Pat. No. 3,984,508, also describes a method of controlling an extrudate using a deckle bar having heating and cooling means. Porter, et al., U.S. Pat. No. 3,973,890, describes adjusting relative positions of the die plates to maintain a constant pressure of heat plastified material. The temperature of the pellet cutting head can be heated or cooled by circulating fluids.

SUMMARY OF THE INVENTION

Hot oil, which is often already being supplied to the inner and outer sections of the die, is used to effect a temperature variation in multiple sectors around the die lips. Passageways are machined into the lips to carry hot oil in and out of the sector. When the volume of hot oil flowing through a sector is adjusted, either thicker material or thinner material can be obtained. For thicker material, the corresponding sector is made hotter by allowing more hot oil to pass through it. This reduces viscosity and friction in that area, allowing more plastic to flow through. The resulting material becomes thicker. Minor corrections can also be made by this method because the hotter metal in the sector expands a little more, increasing the die gap in the area through which the hot oil passes. For thinner material adjacent a particular sector, a reduction in hot oil flow will cause the reverse effect.

Control of sector oil flow can be by manual adjustment of flow control or can be automated by using feedback from a sheet thickness measuring gauge. Signals are processed according to a control algorithm which regulates the flow control valve through a microprocessor. Such a control algorithm for regulating the flow control valve will be apparent to one skilled in the art.

It is an object of the invention to provide a method for adjustment of die lips of a plastics extruder by passing hot oil through channels in the die lips.

It is a further object of the invention to provide a plastics extruder having die lips which are adjusted by controlling a supply of hot oil to channels in the die lips.

BRIEF DESCRIPTION OF THE DRAWINGS

FIG. 1 is a top plan view of the exit portion of a plastics extruder.

FIG. 3 is a partial end view of an outer die lip of the die assembly.

FIG. 4 is a cross-sectional view taken on line 4—4 of FIG. 3.

FIG. 5 is an end view of an oil ring used in the die assembly.

FIG. 6 is an exploded cross-sectional view taken on line 6—6 of FIG. 5.

DETAILED DESCRIPTION OF THE INVENTION

Figure 2:
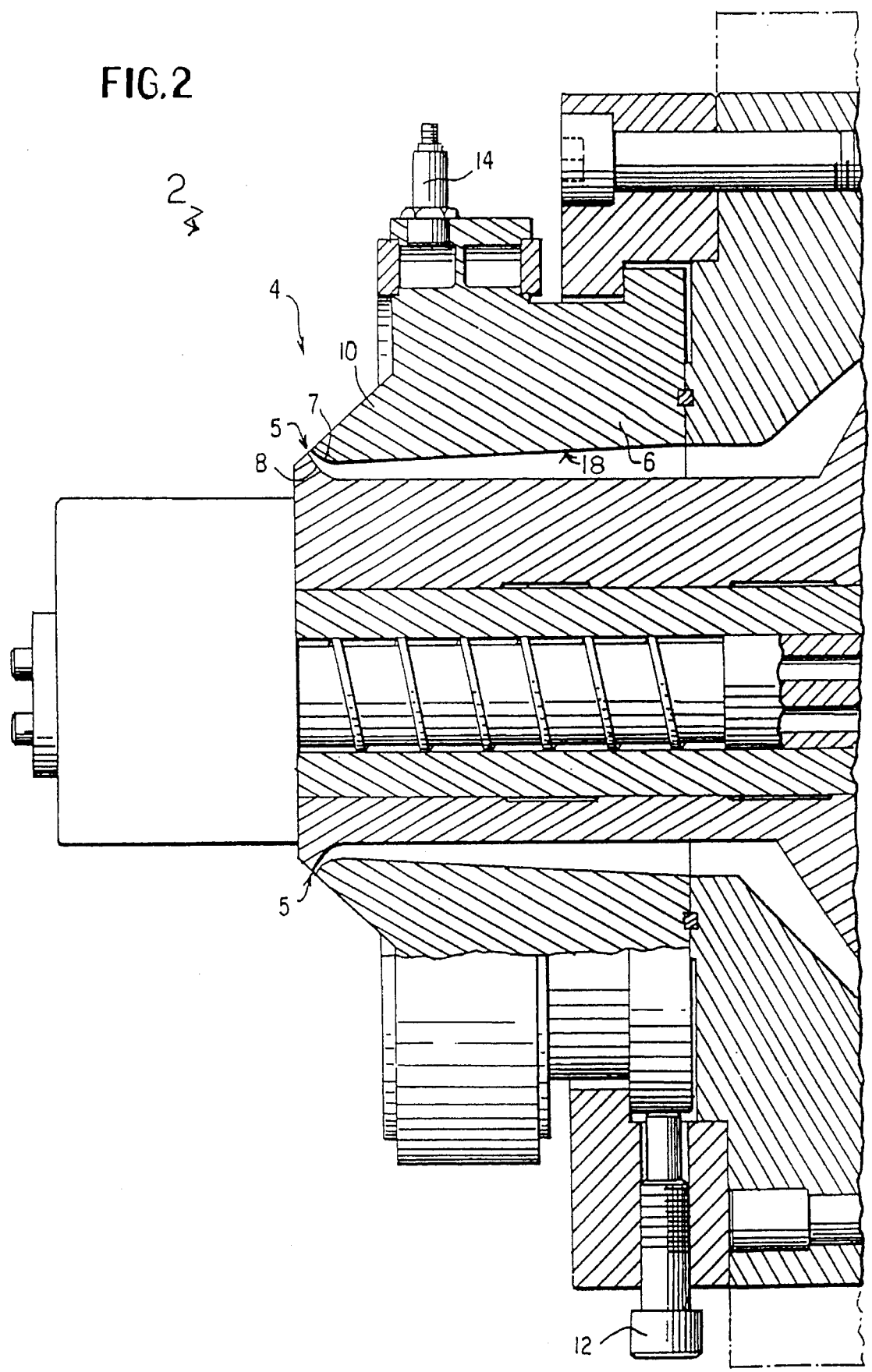
FIG. 2 is a partial cross-sectional view of a die assembly thereof.

A die assembly of the invention includes channels in sectors of an outer lip of the die assembly through which hot oil is passed. The temperature and flow of the oil is controlled for making fine adjustments of the size and shape of the die lips to control the exact size and shape of the plastics extrudate as the extrudate leaves the extruder.

The apparatus and method used provide a more accurate and more controllable adjustment than is obtained using mechanical adjustment of the die lips.

With reference to FIGS. 1 to 6, in which like numerals represent like parts, FIG. 1 shows a top plan view of a die assembly 2 of an extruder housing having an inlet end and outlet end, useful for incorporating a hot oil die lip-adjustment system of the invention. FIG. 2 shows a cross-sectional view of the forward part 4 of die assembly 2. With particular reference to the adjustment of the size of concentric die gap 5 between outer die lip 6 and inner die lip 8, the position of inside section 7 of outer lip 6 may be adjusted with respect to inner lip 8 by passage of oil through outer lip oil ring 10. Adjustment of bolt 12 provides coarse adjustment of concentric die gap 5. Oil flow through outer lip oil ring 10 is controlled by oil flow control valve 14. A plurality of valves 14, corresponding to the number of oil channels, are equally spaced around the die lips.

Outer die lip 6 is shown in detail in FIGS. 3 to 6. In a typical non-limiting example, outer die lip 6, such as a die lip having a 5 to 8 inch diameter, is evenly divided into twelve sectors, each sector containing a separate oil passageway. Other configurations using a different number of sectors may be used.

FIGS. 3 and 4 show enlarged views of outer die lip 6. The molten plastics resin flows through the bore of the extruder and exits through the die lips adjacent polished inner surface 7 of die lip 6. Forward outlet end 9 of outer die lip 6 is curved to complement the shape of inner die lip 8 to form die gap 5 through which the resin is extruded.

As shown in FIG. 5, each sector includes a separate oil passageway. Hot oil at a particular temperature is allowed to flow in an oil passageway through a sector. The sector is either heated or cooled relative to the other sectors, depending on the temperature and flow velocity of the hot oil. The temperature difference is conducted to the corresponding area of inner lip surface 18 of outer die lip 6, within the die, past which molten plastics resin flows. The molten resin flows faster if the sector is hotter or slower if the sector is cooler, effecting the desired change in the final material thickness, corresponding to the temperature of the sector. A flow control valve 14 is employed for each sector to meter the hot oil.

The oil used is typically heat transfer oil operating in the 200° to 600° F. range. The hot oil may be used to heat the die or cool the die, depending on the desired operating temperature of the die zones relative to the temperature to which the flowing oil elevates the temperature of these parts. The temperature on the different areas of lip surface affects only the flow rate of the resin flowing past each area. Since the plastics resin is moving rapidly, only the boundary layer is affected by the difference. The major volume of resin between the lips remains very close to the originally determined melt temperature.

FIGS. 5 and 6 show the oil ring structure, in detail. Oil ring covers 20, 22 are welded to opposite faces 21, 23 of oil ring 24 at welds 25, indicated by the arrows in FIG. 6, to provide air-tight welds. In a typical non-limiting example, the welds are tested for air-tightness at 75 psi.

Oil ring 24 is divided into twelve equal sectors through which oil flows. As shown in FIG. 6, a typical oil inlet passage 26 allows oil to flow to channel 28 adjacent inner surface 30 of oil ring 24. The oil flows out of each sector through oil outlet passage 32. The hot oil for entry into each oil inlet passage 26 enters through oil inlet 34 and is circulated through oil channel 36 which passes around oil ring 24. Oil leaving each oil outlet passage 32 passes into oil channel 38 and exits through oil outlet 40. Oil flow control valve 14, shown in FIG. 2, is threaded into oil inlet 34 communicating with channel 36.

Control of sector oil flow may be manual or automated. An automated method may use feedback from a sheet thickness measuring gauge monitoring the product. The information received is preferably processed automatically and used to automatically control the oil flow in each sector to provide the required sheet thickness around the circumference of the extrudate. The apparatus allows close control of the width of the die gap immediately adjacent the die lips to allow the gap to be adjusted in a plurality of areas around the periphery of the die lips.

It should be realized that the following are salient features of the present invention:

1. The hot oil can be used to heat or cool the die or die sectors and yet still effect the same type of adjustment required for sheet thickness but in reverse. Previous systems operate only by local heating so if the die or lip surface is already too hot from the flow of the plastic, additional heat is undesirable.
2. Oil, as the heating/cooling medium, provides more uniform and complete temperature control by:
    a. Contacting more surface area near the melt path; and
    b. providing a continuous control of the temperature desired rather than the "on/off" control provided by electric heaters.

While the invention has been described above with respect to certain embodiments thereof, it will be appreciated that variations and modifications may be made without departing from the spirit and scope of the invention.

What is claimed is:

1. A method for the control of wall thickness of an extruded thermoplastic material from an extruder, which method comprises:
    a) providing a thermoplastic extruder having an inlet for the introduction of thermoplastic material to be extruded and the extruder having an extrusion means comprising an inner die lip and an outer die lip having an inner lip surface, which inner and outer die lip form a concentric die gap therebetween for the extrusion of thermoplastic material therethrough of selected thickness, the die gap in a thermoplastic flow communication with an inlet of the extruder and providing in the outer die lip a generally radial oil flow inward passageway for the introduction of a heat transfer oil and providing in an outer die lip a generally radial oil outer flow passageway for the withdrawal of heat transfer oil and providing in the outer die lip a plurality of separate, generally uniformly spaced-apart sectors, each sector having a circulating oil passageway adjacent the die lip surface of the outer die lip which forms the die gap and each circulating passageway having an inlet connected to said inward passageway and an outlet connected to said outer passageway;
    b) introducing a thermoplastic material to be extruded into the inlet of the extruder;
    c) extruding the introduced thermoplastic material from the die gap with a defined wall thickness; and
    d) circulating a heat transfer oil from a common source at a selected heating or cooling temperature at an adjustable controlled flow rate for each sector through the circulating oil passageways of each sector to control the temperature at said inner lip surface of each sector, so as to adjust the viscosity of the thermoplastic material at each sector being extruded through the die gap and thereby to control the wall thickness of the extruded thermoplastic material.

2. A method for the control of wall thickness of an extruded thermoplastic material, which method comprises:
    a) introducing a thermoplastic material into an extruder having a first die lip and a second die lip which form a die gap therebetween for the extrusion of a thermoplastic material, said first die lip having a plurality of separate sectors each having an inner die lip surface adjacent said die gap, and each sector having a circulating oil passageway;
    b) connecting in series the circulating oil passageway of each sector to a common source of heat transfer oil;

c) circulating through each of the connected oil passageways of each sector and said source of heat transfer oil, a heat transfer oil at a selected heating and cooling temperature;

d) extruding thermoplastic material through said die gap to form an extruded thermoplastic material having a defined wall thickness; and e) controlling by an oil flow control valve at each circulating oil passageway, the rate of flow of said heat transfer oil in each circulating oil passageway of each sector to control the temperature conducted to the inner die lip surface of each sector, so as to adjust the viscosity of the extruded thermoplastic material adjacent the inner die lip surface of each sector, thereby controlling the wall thickness of the extruded thermoplastic material.

3. The method of claim 2 which includes radially introducing said heat transfer oil and radially withdrawing said heat transfer oil from said circulating oil passageway of each sector.

4. The method of claim 2 which includes employing a heat transfer oil at a temperature ranging from about 200° to 600° F.

5. The method of claim 2 wherein said first die lip comprises an oil inlet channel and an oil withdrawal channel, said channels connected respectively to an inlet and an outlet of each circulating oil passageway, and which method includes introducing heat transfer oil from said source through said inlet channel and withdrawing heat transfer oil from said outlet channel.

6. The method of claim 2 which includes providing said first and second die lips to form a concentric die gap therebetween for the extrusion of thermoplastic material therethrough, said first die lip forming the outer die lip and said second die lip forming the inner die lip.

7. The method of claim 6 which includes positioning said sectors in a generally uniformly spaced-apart manner about the circumference of said inner lip surface of said outer die lip.

8. The method of claim 2 which includes measuring the wall thickness of the extruded thermoplastic material and employing a feedback means to adjust automatically the flow of heat transfer oil in each sector to adjust the wall thickness of the extruded thermoplastic material.

9. The method of claim 8 which includes:

a) measuring the wall thickness of the extruded thermoplastic material by a measuring gauge means to provide a wall thickness signal;

b) feeding back the signal to a microprocessor;

c) regulating the adjustable oil flow control valves by the microprocessor to adjust the flow rate of heat transfer oil in each sector to control the wall thickness of the extruded thermoplastic material.

10. The method of claim 2 which includes providing the oil control valve at an inlet of each circulating oil passageway.

* * * * *